United States Patent
Kume

(10) Patent No.: US 7,392,753 B2
(45) Date of Patent: Jul. 1, 2008

(54) PROCESS AND APPARATUS FOR DISPOSAL OF WASTES

(75) Inventor: Shouichi Kume, Minoo (JP)

(73) Assignee: Tokyo Elex Co., Ltd., Osaka (JP)

( * ) Notice: Subject to any disclaimer, the term of this patent is extended or adjusted under 35 U.S.C. 154(b) by 0 days.

(21) Appl. No.: 10/471,206

(22) PCT Filed: Jan. 7, 2003

(86) PCT No.: PCT/JP03/00046

§ 371 (c)(1),
(2), (4) Date: Nov. 5, 2003

(87) PCT Pub. No.: WO2004/042279

PCT Pub. Date: May 21, 2004

(65) Prior Publication Data

US 2004/0231574 A1    Nov. 25, 2004

(30) Foreign Application Priority Data

Nov. 7, 2002 (JP) ............................. 2002-324045
Jan. 6, 2003 (JP) ............................. 2003-000474

(51) Int. Cl.
*F23K 3/00* (2006.01)

(52) U.S. Cl. ............... 110/242; 110/165 R; 110/293; 110/101 R; 110/118; 110/259; 110/346

(58) Field of Classification Search ........... 110/242, 110/165 R, 165 A, 286, 293, 101 R, 105, 110/101 CC, 118, 255, 259, 219, 346; 65/335, 65/134.8; 558/256

See application file for complete search history.

(56) References Cited

U.S. PATENT DOCUMENTS

| 3,457,882 | A | * | 7/1969 | Ruzika ...................... 110/251 |
| 4,598,670 | A | | 7/1986 | Clamser et al. |
| 4,774,893 | A | | 10/1988 | Dumbaugh |
| 5,032,161 | A | * | 7/1991 | Pieper et al. .................. 65/335 |
| 5,383,612 | A | | 1/1995 | Williams |
| RE35,251 | E | * | 5/1996 | van den Broek ............ 110/221 |
| 5,541,386 | A | * | 7/1996 | Alvi et al. .............. 219/121.38 |
| 5,879,617 | A | * | 3/1999 | Fuchs et al. .................. 266/89 |
| 6,101,959 | A | | 8/2000 | Bronicki et al. |
| 6,213,029 | B1 | * | 4/2001 | Potter et al. ................. 110/229 |

FOREIGN PATENT DOCUMENTS

| DE | 201 21 349 U1 | 7/2002 |
| DE | 20121349 | 7/2002 |
| EP | 54094774 | 7/1979 |
| EP | 0 175 407 A1 | 3/1986 |

(Continued)

*Primary Examiner*—Kenneth Rinehart
(74) *Attorney, Agent, or Firm*—Steptoe & Johnson LLP

(57) ABSTRACT

An apparatus 1 for disposal of wastes comprises a measuring hopper 2 for measuring a charging amount of a waste to be disposed such as domestic wastes, industrial wastes or the like or a charging amount of a solid fuel such as coke, coal or the like, a charging hopper 3 for charging the waste and the solid fuel respectively measured with the measuring hopper 2, a melting furnace 4 for melting the waste charged from the charging hopper 3 at a high temperature to conduct detoxification thereof, and a charging damper 5 arranged between the charging hopper 3 and the melting furnace 4 and having a multistage sluice valve system 9 capable of charging the waste and the solid fuel charged in the charging hopper 3 into the melting furnace 4 without outflowing of a furnace gas to exterior.

13 Claims, 3 Drawing Sheets

FOREIGN PATENT DOCUMENTS

| | | |
|---|---|---|
| EP | 0175407 | 3/1986 |
| EP | 61101710 | 5/1986 |
| EP | 62101710 | 5/1987 |
| EP | 62158913 | 7/1987 |
| EP | 0 374 308 A | 6/1990 |
| EP | 0374308 | 6/1990 |
| EP | 0 684 054 A | 11/1995 |
| EP | 0684054 | 11/1995 |
| JP | 49-41478 | 4/1974 |
| JP | 50-138672 | 11/1975 |
| JP | 54-94774 | 7/1979 |
| JP | 54 094774 A | 7/1979 |
| JP | 55-64629 | 5/1980 |
| JP | 61 101710 A | 5/1986 |
| JP | 62-158913 | 7/1987 |

\* cited by examiner

PROCESS AND APPARATUS FOR DISPOSAL OF WASTES

TECHNICAL FIELD

This invention relates to a process and an apparatus for disposal of wastes in which an amount of a solid fuel such as coke, coal, charcoal, carbide or the like charged for keeping a constant furnace temperature can be effectively reduced when wastes to be treated such as domestic wastes, industrial wastes and the like are disposed in a melting furnace.

BACKGROUND ART

Heretofore, when wastes to be treated such as domestic wastes, industrial wastes and the like are disposed in a vertical melting furnace, there is sequentially or continuously repeated an operation that the waste stored in a storage hopper is properly supplied into the melting furnace through a charging hopper to conduct melting treatment, and thereafter gases inclusive of residue are discharged from an outlet and the residue is separated by means of a cyclone separator, a bag filter or the like to emit a clean-up gas into air.

Such a melting furnace is generally a stoker fired furnace or a rotary kiln fluidized bed furnace, or is a burner-type melting furnace wherein a burner using a heavy oil or propane gas as a fuel is projected toward a furnace core to melt the charged waste.

However, the burner-type melting furnace has drawbacks that combustion cost is high because the heavy oil or propane gas is used as the fuel, and also since a melting temperature in the furnace is a moderate temperature of 300-800° C., fly ash and incinerated ash are generated in the melting furnace after the melting treatment and a large amount of harmful substances such as dioxin and the like are generated in the discharged gas. And also, as shown in FIG. 2, the waste stored in a storage hopper 17' is supplied into a melting furnace 4' through a charging hopper after roughly estimating a charging amount of the waste, or while catching with chucks 19' of a chucked crane 18' without measuring, and hence proper process controls such as adjustment of the furnace temperature and the like are not carried out, so that there is a risk that a furnace gas explodes at the charging inlet in addition to the generation of dioxin as mentioned above.

It is, therefore, an object of the invention to provide a process and an apparatus for disposal of wastes in which an amount of a solid fuel such as coke, coal, charcoal, carbide or the like charged for keeping a constant furnace temperature can be effectively reduced when wastes to be treated such as domestic wastes, industrial wastes and the like are disposed in a melting furnace.

DISCLOSURE OF THE INVENTION

In order to achieve the above object, the apparatus for disposal of wastes according to the invention comprises a measuring hopper for measuring each of a charging amount of a waste to be disposed such as domestic wastes, industrial wastes or the like and a charging amount of a solid fuel such as coke, coal or the like, a charging hopper for charging the waste and the solid fuel respectively measured with the measuring hopper, a melting furnace for melting the waste charged from the charging hopper at a high temperature to conduct detoxification thereof, and a charging damper arranged between the charging hopper and the melting furnace and having a multistage sluice valve system capable of charging the waste and the solid fuel charged in the charging hopper into the melting furnace without outflowing of a furnace gas to exterior.

In the charging damper, it is preferable that a space defined between sluice valves constituting the multistage sluice valve system forms an inert gas seal of a positive pressure by filling the space with the inert gas such as nitrogen gas or the like to thereby render the melting furnace into a closed structure.

Moreover, it is preferable that the number of sluice valves constituting the multistage sluice valve system is 2, and a sluice valve located at an upward side has a load-bearing structure temporarily damming the dropping waste and a sluice valve located at a downward side has a fireproof and closed structure.

Furthermore, the measuring hopper is preferable to be further provided with a control device monitoring and controlling the charging amount of the waste.

In addition, it is preferable to further arrange a conveying means being movable between the measuring hopper and the charging hopper and charging the waste and the solid fuel measured in the measuring hopper into the charging hopper. Particularly, the conveying means is more preferable to comprise a skip bucket located beneath the measuring hopper and receiving the waste and the solid fuel measured in the measuring hopper and dropped therefrom, and a winch lifting the skip bucket above the charging hopper.

And also, the measuring hopper is preferable to have a bottom face inclined at a large angle with respect to a horizon so as to smoothly drop the measured waste and solid fuel into the skip bucket.

Moreover, the melting furnace is more preferable to be a coke-bed-type reducing gasification melting furnace.

The process for disposal of wastes according to the invention lies in that when wastes to be disposed such as domestic wastes, industrial wastes and the like are treated by melting at a high temperature in a melting furnace, a charging amount of the waste when a solid fuel such as coke, coal or the like charged in the melting furnace is most burnt in the furnace is previously calculated, and the waste and solid fuel are measured based on the calculated charging amount, and the measured waste and solid fuel are charged into the melting furnace.

And also, the charging ratio of the waste and the solid fuel calculated prior to the charging of the waste and solid fuel into the melting furnace is preferable to be calculated every charge.

Furthermore, it is preferable that the melting furnace is a closed-type melting furnace provided on its upper part with a charging damper having a multistage sluice valve system in which at least one sluice valve of the multistage sluice valve system provided in the charging damper is closed when the waste and the solid fuel are charged into the melting furnace through the charging damper. Especially, it is preferable that the number of sluice valves constituting the multistage sluice valve system is 2, and a sluice valve located at an upward side has a load-bearing structure temporarily damming the dropping waste and a sluice valve located at a downward side has a fireproof and closed structure, and the waste and the solid fuel are charged into the melting furnace by constituting so that when the waste and solid fuel are charged into the melting furnace, only the upper sluice valve is opened and when all of them are dropped, the upper sluice valve is closed and the lower sluice valve is opened.

In addition, it is preferable that a space defined between sluice valves constituting the multistage sluice valve system in the melting furnace forms an inert gas seal of a positive pressure by filling the space with the inert gas such as nitrogen gas or the like to thereby render the melting furnace into a closed structure.

BEST MODE FOR CARRYING OUT THE INVENTION

Figure 1:
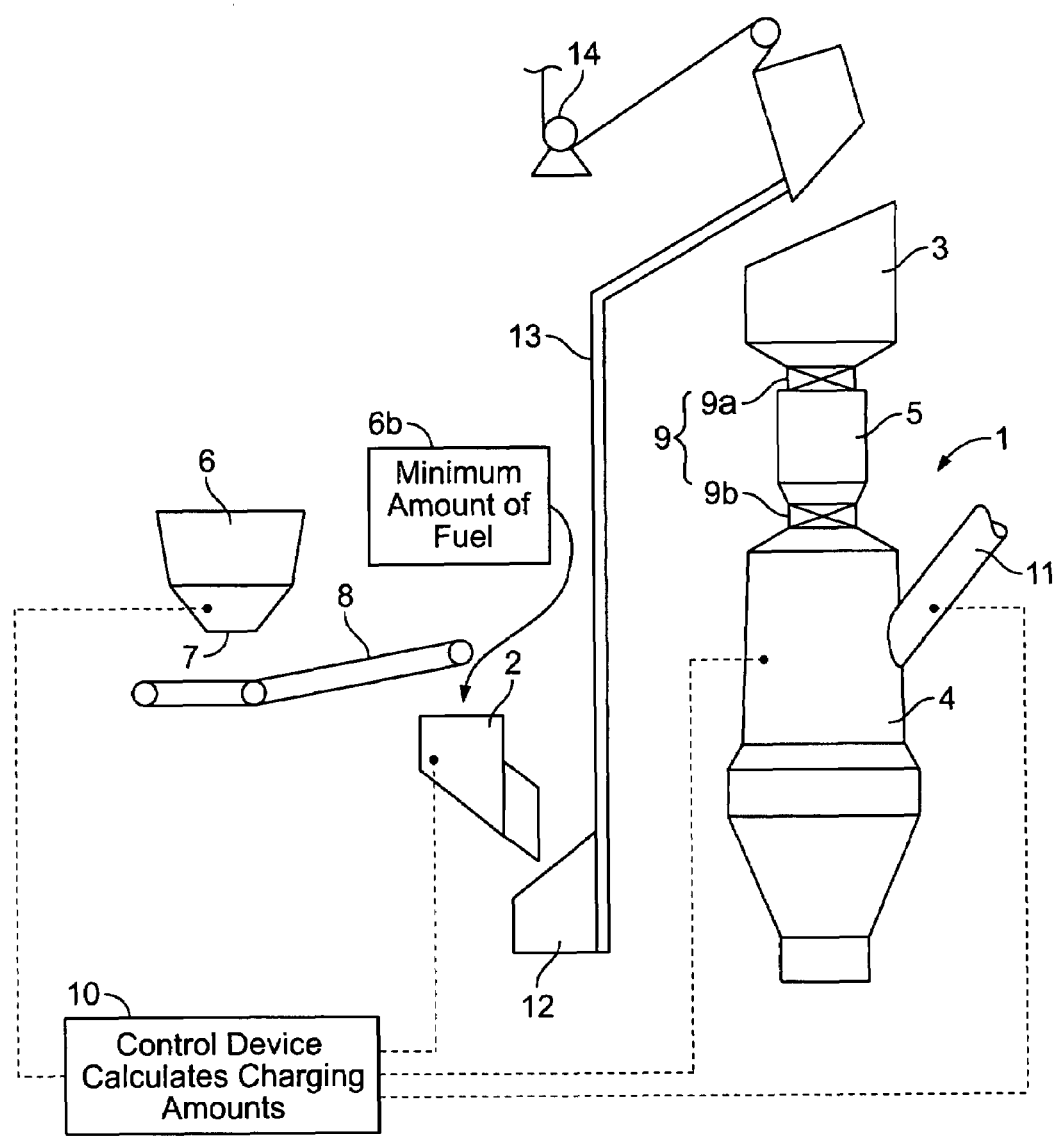
FIG. 1 is a schematically front view of a typical apparatus for disposal of wastes according to the invention.

In FIG. 1 is shown an embodiment of an apparatus according to the invention for disposal of domestic wastes (for example, raw refuse, plastics, etc.) and industrial wastes (for example, medical waste, etc.).

An apparatus 1 for disposal of wastes shown in FIG. 1 is mainly constituted by a measuring hopper 2, a charging hopper 3, a melting furnace 4 and a charging damper 5. In FIG. 1, the apparatus further comprises a storage hopper 6 for storing the wastes, and a conveying means such as a conveyor 8 or the like located beneath the storage hopper and moving a given amount of waste dropped from a feeder 7 of the storage hopper to the measuring hopper.

The measuring hopper 2 is arranged for measuring a charging amount of each of the waste to be disposed such as domestic wastes, industrial wastes or the like and the solid fuel such as coke, coal, charcoal, carbide or the like.

The charging hopper 3 is arranged on an upper portion of the melting furnace 4 as a charging inlet for charging the waste and solid fuel measured in the measuring hopper 2 into the melting furnace.

The melting furnace 4 is preferably a coke-bed-type reducing gasification melting furnace at where the waste charged through the charging hopper 3 is melted at a high temperature of 1200-2600° C. to detoxify the waste as slag and/or metal.

The charging damper 5 is arranged between the charging hopper 3 and the melting furnace 4, and is provided with a multistage sluice valve system 9 capable of charging the waste and the solid fuel charged from the charging hopper 3 into the melting furnace 4 without outflowing of a furnace gas. Especially, in FIG. 1, the charging hopper 3, the multistage sluice valve system 9 and the melting furnace 4 are arranged along a vertical line in a row to form a vertical closed melting furnace.

In the charging damper 5, a space defined between sluice valves 9a and 9b constituting the multistage sluice valve system 9 forms an inert gas seal of a positive pressure, i.e. a pressure higher than atmospheric pressure by filling the space with the inert gas such as nitrogen gas or the like to thereby render the melting furnace into a closed structure. Thus, even if the furnace gas contains a harmful gas, the furnace gas is not discharged from the charging damper 3 toward the outside, so that there is no risk of generating gas explosion resulted from it.

And also, when the number of the sluice valves constituting the multistage sluice valve system is 2 as shown in FIG. 1, the sluice valve 9a located at the upward side is preferable to have a load-bearing structure temporarily damming the dropping waste, and the sluice valve 9b located at the downward side is preferable to have a fireproof and closed structure contacting with a high temperature gas inside the furnace and shutting off the discharge of the furnace gas from a top of the furnace toward the outside.

The measuring hopper 2 is preferable to be further provided with a control device 10 monitoring and controlling the charging amount of the waste. By the control device 10, the charging amount of the solid fuel can be adjusted to a minimum amount 6b constantly keeping the combustibility of the coke in the melting furnace in relation to the charging amount of the waste, whereby the waste can be effectively disposed with a small fuel cost. Also, the temperature inside the furnace can be constantly kept at a high temperature of 1200-2600 degrees C., so that the generation of harmful substances such as dioxin and the like in the furnace gas can be reduced as far as possible. Moreover, the control device 10 is also connected to the melting furnace 4 and a gas discharge tube 11 in FIG. 1 so as to conduct the measurement of given amount in the measuring hopper 2 considering conditions such as temperature and the like in the melting furnace and the gas discharge tube, but it is not limited to only this construction.

In FIG. 1, the apparatus is further provided with a conveying means being movable between the measuring hopper and the charging hopper for charging the waste and the solid fuel measured in the measuring hopper 2 into the charging hopper 3. More concretely, the conveying means comprises a skip bucket 12 located beneath the measuring hopper 2 and receiving the waste and the solid fuel measured in the measuring hopper 2 and dropped therefrom, and a winch 14 lifting the skip bucket 12 along a guide member 13 such as a rail up to the charging hopper 3. The conveying means is not limited to only this construction unless the waste and solid fuel measured in the measuring hopper 2 can be charged into the charging hopper 3.

The measuring hopper 2 is preferable to have a bottom face inclined at a large angle with respect to a horizon so as to smoothly drop the measured waste and solid fuel into the skip bucket 12 because the dropping movement of the waste and the solid fuel from the measuring hopper 2 to the skip bucket 12 can surely be performed in a short time. This results in the shortening of the time for charging the waste and the solid fuel into the melting furnace, which can enhance the disposal capacity of the waste. Furthermore, when an area of an outlet port of the measuring hopper 2 is made large, the dropping movement of the waste and the solid fuel to the skip bucket can be preferably accelerated.

The process for disposal of wastes according to the invention will be explained below.

When the wastes to be disposed such as domestic wastes, industrial wastes and the like are treated by melting at a high temperature in the melting furnace, the charging amount of the waste when the solid fuel such as coke, coal or the like charged into the melting furnace is most burnt in the furnace is previously calculated, and the waste and the solid fuel are measured based on the calculated charging ratio, respectively, and then the measured waste and solid fuel are charged into the melting furnace.

Moreover, in case of increasing or decreasing the charging amount with respect to the previous charging amount, the charging ratio of the waste and the solid fuel calculated prior to the charge of them into the melting furnace is preferable to be calculated every charge. In this way, not only the generation of dioxin but also the generation of fly ash and burnt ash can be suppressed while constantly keeping the combustion of the solid fuel such as coke and the like.

Since the melting furnace 4 is a closed type melting furnace provided on its upper portion with a charging damper 5 having a multistage sluice valve system 9, it is preferable that when the waste and solid fuel are charged through the charging damper 5, at least one sluice valve in the multistage sluice valve system 9 arranged in the charging damper 5 is closed in order to ensure the sealing properties of the melting furnace 4.

For example, when the number of the sluice valves constituting the multistage sluice valve system is 2, it is preferable that the sluice valve 9a located at the upward side has a load-bearing structure temporarily damming the dropping waste, and the sluice valve 9b located at the downward side has a fireproof and closed structure, and when the waste and the solid fuel are charged into the melting furnace 4, only the upper sluice valve 9a is opened and when all of them are dropped, the upper sluice valve 9a is closed and the lower sluice valve 9b is opened, whereby the waste and the solid fuel are charged into the melting furnace 4.

And also, an inert gas such as nitrogen or the like is filled in a space defined between sluice valves 9a and 9b constituting the multistage sluice valve system 9 to form an inert gas seal of a positive pressure to thereby render the melting furnace 4 into a closed structure, whereby the leakage of harmful gas generated in the furnace toward the outside is prevented during the charging.

Figure 2:
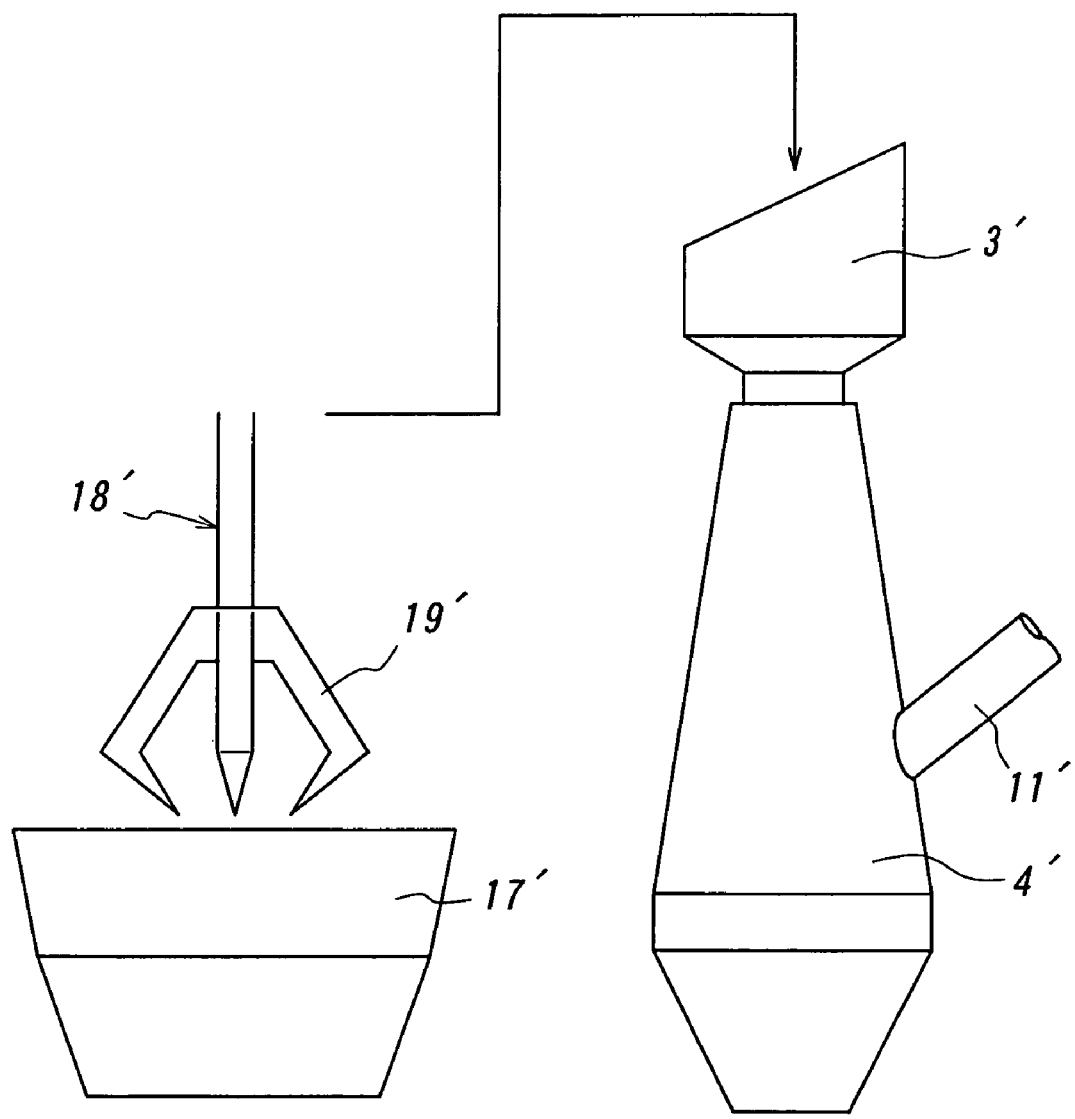
FIG. 2 is a schematically front view of (a part of) the conventional apparatus for disposal of wastes.

The waste disposal is carried out by using the apparatus for disposal of wastes according to the invention (FIG. 1). The melting furnace is a coke-bed-type reducing gasification melting furnace 4, which consumes 0.75 kg of coke as a solid fuel for disposing 1 kg of the waste. As a result of analyzing the gas discharged from the gas discharge tube 11 in the melting furnace 4, the concentration of dioxin in the gas is 0.002 ppm. On the contrary, in the conventional melting furnace as shown in FIG. 2, 1.4 kg of coke as a solid fuel is consumed for disposing 1 kg of the waste, which is about two times the coke consumption in the melting furnace constituting the apparatus for disposal of wastes according to the invention, and also the concentration of dioxin in the discharged gas is 160 ppm. As seen from this comparison, the apparatus for disposal of wastes according to the invention is low in the fuel cost and has excellent burning characteristics.

Figure 3:
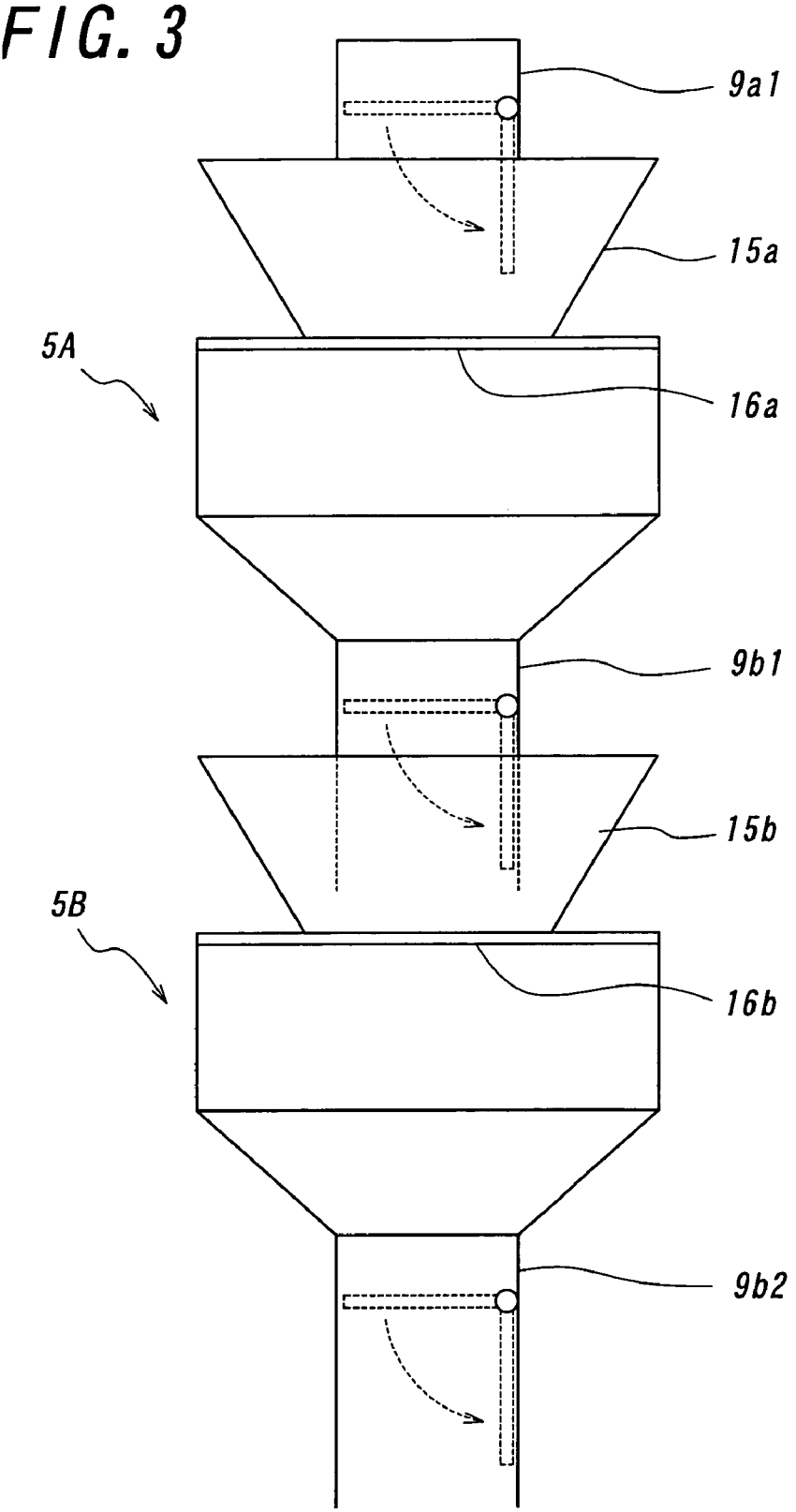
FIG. 3 is an enlarged front view of only a two-stage charging damper constituting another apparatus for disposal of wastes according to the invention.

In another embodiment of the invention, as shown in FIG. 3, two charging dampers 5A, 5B are arranged at an overlapping state on a central axis of the melting furnace 4 in which each of the charging dampers 5a or 5b is constituted by an upper sluice valve 9a1 (provided in only the charging damper 5A) as a sluice valve for receiving the waste, a cut gate 15a or 15b located therebeneath, a nitrogen sealing sluice valve 16a or 16b, and a lower sluice valve 9b1 or 9b2 as a lower sluice valve for receiving the waste. By arranging the two-stage charging dampers 5A, 5B, it is possible to further prevent the outflowing of the furnace gas, the ash and the like from the furnace and also the gas explosion at the top of the furnace can be prevented before occurrence. Although the case arranging the two-stage charging dampers 5A, 5B is shown in FIG. 3, three or more charging dampers may be arranged at a state of overlapping them, if necessary.

Although the above is described with respect to only a preferred embodiment of the invention, various modifications may be taken within a scope of the invention.

INDUSTRIAL APPLICABILITY

According to the invention, it is possible to provide a process and an apparatus for disposal of wastes capable of effectively reducing the charging amount of the solid fuel such as coke, coal, charcoal, carbide or the like for constantly keeping the temperature in the furnace when the wastes to be disposed such as domestic wastes, industrial wastes and the like are treated in a melting furnace. Especially, the waste and the solid fuel are charged in the melting furnace at such a charging ratio that the solid fuel such as coke, coal and the like charged into the melting furnace is most burnt in the furnace, so that the high-temperature melting treatment can stably be carried out in the melting furnace and also the furnace temperature can be maintained at a high-temperature state and hence the generation of the harmful substances such as dioxin and the like can be largely restrained.

And also, by arranging the multistage sluice valve system on the inlet port for charging the raw materials (such as waste and solid fuel) and/or by filling an inert gas such as nitrogen or the like in the space defined between the sluice valves constituting the multistage sluice valve system to form an inert gas seal of a positive pressure to thereby render the melting furnace into a closed structure, there is no risk of the gas explosion at the top of the furnace and also there is no fear of scattering the furnace gas including the harmful gas into air.

Furthermore, by increasing the inclination angle of the bottom of the measuring hopper, or by enlarging the outlet port of the measuring hopper or the like, the time required from the measurement to the charging of the waste into the melting furnace results in shortening and hence the disposal capacity of the melting furnace can be enhanced.

The invention claimed is:

1. An apparatus for disposal of wastes, the apparatus comprising:
a measuring hopper configured for separately measuring each of a charging amount of a waste and a charging amount of a solid fuel,
a charging hopper for charging separately measured amounts of each of waste and solid fuel, respectively, measured by the measuring hopper,
a melting furnace for melting the waste charged from the charging hopper at a temperature sufficient for detoxifying melted waste,
a charging damper arranged between the charging hopper and the melting furnace and having a multistage sluice valve system for charging waste and solid fuel charged in the charging hopper into the melting furnace without emission of toxic furnace gas outside the furnace, and
a control device connected to the measuring hopper and the melting furnace and for adjusting the charging amount of solid fuel to the minimum amount required constantly to keep combustibility of solid fuel and waste in the melting furnace.

2. An apparatus for disposal of wastes according to claim 1, wherein the multistage sluice valve system comprises sluice valves, a space between said sluice valves, and means for filling an inert gas in said space to form a positive pressure inert gas seal with the melting furnace to thereby render the melting furnace into a closed structure.

3. An apparatus for disposal of wastes according to claim 1, wherein the multistage sluice valve system comprises two sluice valves, one of said sluice valves being located at an upward side of the system and having a load-bearing structure for temporarily damming dropping waste and the other said sluice valves being located at a downward side of the system and having a fireproof and closed structure.

4. An apparatus for disposal of wastes according to claim 1, further comprising a conveying means being movable between the measuring hopper and the charging hopper and for charging waste and solid fuel measured in the measuring hopper into the charging hopper.

5. An apparatus for disposal of wastes according to claim 4, wherein the conveying means comprises a skip bucket located beneath the measuring hopper and for receiving waste and solid fuel measured in the measuring hopper and for receiving waste and solid fuel measured in the measuring hopper and dropped therefrom, and a winch for lifting the skip bucket above the charging hopper.

6. An apparatus for disposal of wastes according to claim 5, wherein the measuring hopper has a bottom face inclined at a large angle with respect to a horizon for smoothly dropping measured waste and solid fuel into the skip bucket.

7. An apparatus for disposal of wastes according to claim 1, wherein the melting furnace is a coke-bed-type reducing gasification melting furnace.

8. A process for disposal of wastes by melting in a melting furnace operating at a temperature sufficient for detoxifying melted waste, comprising calculating with a control device, a charging amount of waste and a charging amount of solid fuel to be charged into the furnace when a solid fuel previously charged in the melting furnace has been completely burned in the furnace, measuring charging amounts of the waste and solid fuel based on the calculated charging amounts, the charging amount of the solid fuel being the minimum amount required to maintain combustibility of the solid fuel and waste in the melting furnace, and charging each of the measured waste charging amount and solid fuel charging amount into the melting furnace.

9. A process for disposal of wastes according to claim 8, wherein a charging ratio of waste charging amount and solid fuel charging amount is calculated prior to every charging of waste and solid fuel into the melting furnace.

10. A process for disposal of wastes according to claim 8, wherein the melting furnace is a closed-type melting furnace comprising on its upper part a charging damper having a multistage sluice valve system comprising at least one sluice valve for being closed when waste and solid fuel are charged into the melting furnace through the charging damper.

11. A process for disposal of wastes according to claim 8, wherein 11 the multistage sluice valve system comprises two sluice valves, and one of said sluice valves located at an upward side of the system comprises a load-bearing structure for temporarily damming dropping waste and the other of said sluice valves located at a downward side of the system comprises a fireproof and closed structure, so that when waste and solid fuel are charged into the melting furnace, only the upper sluice valve is opened and after all of such waste and solid fuel are dropped, the upper sluice valve is closed and the lower sluice valve is opened.

12. A process for disposal of wastes according to claim 10, further comprising filling an inert gas in a space defined between said two sluice valves to form a positive pressure inert gas seal with the melting furnace to thereby render the melting furnace into a closed structure.

13. An apparatus for disposal of wastes according to claim 1, wherein said measuring hopper comprises a bottom face inclined at a large angle with respect to a horizon for smoothly dropping measured waste or solid fuel.

* * * * *